(12) United States Patent
Nogami

(10) Patent No.: US 7,957,312 B2
(45) Date of Patent: Jun. 7, 2011

(54) COMMUNICATION UNIT, COMMUNICATION SYSTEM, COMMUNICATION METHOD AND COMMUNICATION PROGRAM

(75) Inventor: Kousuke Nogami, Tokyo (JP)

(73) Assignee: NEC Corporation, Tokyo (JP)

( * ) Notice: Subject to any disclaimer, the term of this patent is extended or adjusted under 35 U.S.C. 154(b) by 356 days.

(21) Appl. No.: 12/095,104

(22) PCT Filed: Nov. 27, 2006

(86) PCT No.: PCT/JP2006/323546
§ 371 (c)(1),
(2), (4) Date: May 27, 2008

(87) PCT Pub. No.: WO2007/061087
PCT Pub. Date: May 31, 2007

(65) Prior Publication Data
US 2009/0310493 A1 Dec. 17, 2009

(30) Foreign Application Priority Data
Nov. 28, 2005 (JP) .................................. 2005-342076

(51) Int. Cl.
*G01R 31/08* (2006.01)
(52) U.S. Cl. ........ 370/252; 370/242; 370/337; 709/220; 714/776

(58) Field of Classification Search .................. 370/242, 370/252, 329, 516; 714/748–752, 776; 709/220
See application file for complete search history.

(56) References Cited

U.S. PATENT DOCUMENTS

| | | | |
|---|---|---|---|
| 2002/0136192 A1* | 9/2002 | Holma et al. | 370/347 |
| 2003/0126238 A1* | 7/2003 | Kohno et al. | 709/220 |
| 2005/0111371 A1* | 5/2005 | Miura et al. | 370/242 |
| 2005/0154965 A1* | 7/2005 | Ichiki et al. | 714/776 |

FOREIGN PATENT DOCUMENTS

| | | |
|---|---|---|
| JP | 2003-179580 A | 6/2003 |
| JP | 2005-159433 A | 6/2005 |
| JP | 2005-198191 A | 7/2005 |

\* cited by examiner

*Primary Examiner* — Aung S Moe
*Assistant Examiner* — Vinncelas Louis
(74) *Attorney, Agent, or Firm* — Sughrue Mion, PLLC

(57) ABSTRACT

A transmission-time measurement section (201) and a jitter measurement section (202) measure transmission time length and jitter, respectively, by using the packets transmitted/received. A forward-error-correction (FEC)-scheme maximum-jitter measurement section (203) calculates a maximum jitter in the case of adopting an FEC scheme, and an automatic-retransmission-request (ARQ)-scheme maximum-jitter measurement section (204) calculates a maximum jitter in the case of adopting an ARQ scheme from the measured information. A packet control section (205) selects a communication scheme having a smaller maximum jitter from both schemes based on the calculation result of the FEC-maximum-jitter measurement section (203) and ARQ-maximum-jitter measurement section (204).

7 Claims, 8 Drawing Sheets

COMMUNICATION UNIT, COMMUNICATION SYSTEM, COMMUNICATION METHOD AND COMMUNICATION PROGRAM

TECHNICAL FIELD

The present invention relates to a communication unit, a communication system, a communication method and a communication program and, more particularly, to the communication unit, communication system, communication procedure and communication program that select a communication scheme.

BACKGROUND ART

The number of applications is increasing which transmit video data and audio data as IP (internet protocol) packets from a transmitting side to a receiving side, and decompose and reproduce the video data and audio data at the receiving side. For example, IP telephone (VoIP) on the Internet, and video delivery of teleconference, movie and live may be enumerated. In these applications, in order for maintaining the quality of video or audio, it is an important factor to suppress occurring of jitter and packet loss. The "jitter" means fluctuation of the time length need for receiving, at the receiving side, the packet transmitted from the transmitting side.

If a large jitter occurs, the receiving interval of the video data or audio data is enlarged, and thus a quality degradation is encountered wherein a normal reproduction is impossible. The packet loss is a phenomenon such that the transmitted packet disappears due to a network congestion etc., and thus is not received at the receiving side. For this phenomenon, an application on the receiving side cannot receive the packets needed for reproduction, which causes a trouble in the reproduction.

As a communication protocol in the application such as for the video and audio delivery, a protocol without a retransmission control is mostly used. UDP (user datagram packet) may be exemplified as a communication protocol generally used. The UDP is a communication protocol that is used for achieving a weight saving and a high speed. More specifically, if a transmitted packet is lost before reaching a terminal on the receiving side, the lost packet is not retransmitted. For this reason, although there may be some data that are not replicated at the receiving side, a delay accompanied by the retransmission does not occur. However, in consideration that there may be a quality degradation due to the absence of the retransmission, a method has been proposed and realized for improving the tolerance to the packet loss.

Patent Publication JP-2002-9883A proposes a method for preventing the quality degradation caused by the packet loss by using an automatic repeat request (ARQ) scheme, and a forward error correction (FEC) scheme.

The ARQ scheme is such that if a packet loss is detected at the receiving side, the receiving side requests retransmission of the corresponding packet from the transmitting side to thereby recover the packet loss. The FEC scheme is such that the transmitting side prepares a redundant packet or packets beforehand and transmits the same together with the original data to the receiving side. If a packet loss occurs, it is possible to use the redundant packet or packets to recover the packet loss at the receiving side.

Conventionally, one of the ARQ scheme and FEC scheme had to be fixedly selected as a means to recover the packet loss. JP-2002-9883A proposes an appropriate changeover between the ARQ scheme and the FEC scheme based on the state of the network. In JP-2002-9883A, an error rate (number of error bits/total number of transmitted bits) is used as the reference value for the changeover between the ARQ scheme and the FEC scheme. This is based on the following reasons.

The ARQ scheme functions effectively if the total number of transmitted bits is larger and the number of error bits is smaller; however, the ARQ scheme has a poor efficiency if the total number of transmitted bits is smaller and the number of error bits is larger. On the other hand, the FEC scheme functions effectively if the total number of transmitted bits is smaller and the number of error bits is larger; however, the ARQ scheme has a poor efficiency if the total number of bits is larger and the number of error bits is smaller, due to a higher overhead of the FEC packets.

For that reason, JP-2002-9883A recites that setting of a threshold based on the error rate allows the changeover to be performed between the ARQ scheme and the FEC scheme based on whether or not the error rate exceeds the threshold.

There is another index based on which the network is to be evaluated, other than the error rate. For example, as described before, there is jitter as a parameter that affects the quality of the video and audio delivery. The problem in the above patent publication will be conspicuous under the circumstance of a larger jitter and a higher packet loss rate.

The technique according to JP-2002-9883A will employ the FEC scheme based on a higher degree of the packet loss rate. It is necessary in the FEC scheme to await arrival of a redundant packet for performing recovery of the packet loss. However, the larger jitter may delay the arrival of the redundant packet. Thus, even though recovery of the lost packet itself may be achieved, there may be a case where the reproduction cannot be performed in time. Accordingly, it cannot be judged in this case that the FEC scheme is the optimum. In other words, the error rate alone is insufficient as the index for the judgment of the changeover between the ARQ scheme and the FEC scheme, and accordingly, there may arise a quality degradation during the reproduction in the technique of JP-2002-9883A.

DISCLOSURE OF THE INVENTION

It is an object of the present invention to provide communication unit, communication system, communication method, and communication program that solve the conventional problem as described above.

The present invention provides, in a first aspect thereof, a communication unit including: a transmission-time measurement section that calculates a transmission time length of a packet; a jitter measurement section that calculates an average value of jitter based on an arrival time of the packet; an FEC-maximum-jitter measurement section that calculates, based on a relative redundancy determined beforehand, a first estimated maximum jitter representing a maximum jitter estimated in a case of selecting a forward error correction (FEC) scheme; an ARQ-maximum-jitter measurement section that calculates, based on the transmission time length and the average value of jitter, a second estimated maximum jitter representing a maximum jitter estimated in a case of selecting an automatic repeat request (ARQ) scheme; and a packet control section (205) that selects the FEC scheme if the first estimated maximum jitter is smaller than the second estimated maximum jitter, and selects the ARQ scheme if the first estimated maximum jitter is larger than the second estimated maximum jitter.

In the communication unit according to the first aspect of the present invention, the packet control section may select the ARQ scheme, even if the first estimated maximum jitter is smaller than the second estimated maximum jitter, in a case where a consumed band increased by a selection of the FEC scheme exceeds a usable band.

The present invention provides, in a second aspect thereof, a communication system including a transmitting-side unit including the communication unit according to the first aspect, a receiving-side unit including the communication unit according to the first aspect, and a network connecting together the transmitting-side unit and the receiving-side unit.

The present invention provides, in a third aspect thereof, a communication unit including: a transmission-time measurement section that calculates a transmission time length of a packet; a jitter measurement section that calculates an average value of jitter based on a arrival time of the packet; a packet-loss-rate measurement section that calculates a packet loss rate based on a sequential number of received packets; a relative-redundancy calculation section that calculates, based on the packet loss rate and a requested reproduction signal quality, a relative redundancy which can realize a requested reproduction signal quality in an FEC scheme; a retransmission-time calculation section that calculates, based on the packet loss rate and the requested reproduction signal quality, a number of times of retransmission that can realize the requested reproduction signal quality in an ARQ scheme; an FEC-maximum-jitter measurement section that calculates, based on the calculated relative redundancy, a first estimated maximum jitter representing a maximum jitter estimated in a case of selecting the FEC scheme; an ARQ-maximum-jitter measurement section that calculates, based on the calculated number of times of retransmission, a second estimated maximum jitter representing a maximum jitter estimated in a case of selecting the ARQ scheme; and a packet control section that selects the FEC scheme if the first estimated maximum jitter is smaller than the second estimated maximum jitter, and selects the ARQ scheme if the first estimated maximum jitter is larger than the second estimated maximum jitter.

In the communication unit according to the third aspect of the present invention, the packet control section may select the ARQ scheme even if the first estimated maximum jitter is smaller than the second estimated maximum jitter, in a case where a consumed band increased by selection of the FEC scheme exceeds a usable band.

The present invention provides, in a fourth aspect thereof, a communication system including a transmitting-side unit including the communication unit according to the third aspect, a receiving-side unit including the communication unit according to the third aspect, and a network connecting together the transmitting-side unit and the receiving-side unit.

The present invention provides, in a fifth aspect thereof, a communication method including the steps of: calculating, based on a relative redundancy determined beforehand, a first estimated maximum jitter representing a maximum jitter estimated in a case of selecting an FEC scheme; calculating a transmission time length of a packet; calculating an average value of jitter based on an arrival time of the packet; calculating, based on the average value of jitter, a second estimated maximum jitter representing a maximum jitter estimated in a case of selecting an ARQ scheme; selecting the (FEC) scheme if the first estimated maximum jitter is smaller than the second estimated maximum jitter, and selecting the ARQ scheme if the first estimated maximum jitter is larger than the second estimated maximum jitter.

In the communication method according to the fifth aspect of the present invention, the selecting step may select the ARQ scheme even if the first estimated maximum jitter is smaller than the second estimated maximum jitter, in a case where a consumed band increased by selection of the FEC scheme exceeds a usable band.

The present invention provides, in a sixth aspect thereof, a communication method including the steps of: calculating a transmission time length of a packet; calculating an average value of jitter based on a arrival time of the packet; calculating a packet loss rate based on a sequential number of received packets; calculating, based on the packet loss rate and a requested reproduction signal quality, a relative redundancy which can realize a requested reproduction signal quality in an FEC scheme; calculating, based on the packet loss rate and the requested reproduction signal quality, a number of times of retransmission that can realize the requested reproduction signal quality in an ARQ scheme; calculating, based on the calculated relative redundancy, a first estimated maximum jitter representing a maximum jitter estimated in a case of selecting the FEC scheme; calculating, based on the calculated number of times of retransmission, a second estimated maximum jitter representing a maximum jitter estimated in a case of selecting the ARQ scheme; and selecting the FEC scheme if the first estimated maximum jitter is smaller than the second estimated maximum jitter, and selects the ARQ scheme if the first estimated maximum jitter is larger than the second estimated maximum jitter.

In the communication method according to the sixth aspect of the present invention, the selecting step may select the ARQ scheme even if the first estimated maximum jitter is smaller than the second estimated maximum jitter in a case where a consumed band increased by selection of the FEC scheme exceeds a usable band.

The present invention provides, in a seventh aspect thereof, a communication program for allowing a computer of a communication unit to execute the steps of: calculating, based on a relative redundancy determined beforehand, a first estimated maximum jitter representing a maximum jitter estimated in a case of selecting an FEC scheme; calculating a transmission time length of a packet; calculating an average value of jitter based on an arrival time of the packet; calculating, based on the average value of jitter, a second estimated maximum jitter representing a maximum jitter estimated in a case of selecting an ARQ scheme; and selecting the FEC scheme if the first estimated maximum jitter is smaller than the second estimated maximum jitter, and selecting the ARQ scheme if the first estimated maximum jitter is larger than the second estimated maximum jitter.

In the program according to the seventh aspect of the present invention, the selecting step may select the ARQ scheme even if the first estimated maximum jitter is smaller than the second estimated maximum jitter, in a case where a consumed band increased by selection of the FEC scheme exceeds a usable band.

The present invention provides, in an eighth aspect of thereof, a communication program allowing a computer of a communication unit to execute the steps of: calculating a transmission time length of a packet; calculating an average value of jitter based on a arrival time of the packet; calculating a packet loss rate based on a sequential number of received packets; calculating, based on the packet loss rate and a requested reproduction signal quality, a relative redundancy which can realize a requested reproduction signal quality in an FEC scheme; calculating, based on the packet loss rate and the requested reproduction signal quality, a number of times of retransmission that can realize the requested reproduction signal quality in an ARQ scheme; calculating, based on the calculated relative redundancy, a first estimated maximum jitter representing a maximum jitter estimated in a case of selecting the FEC scheme; calculating, based on the calculated number of times of retransmission, a second estimated maximum jitter representing a maximum jitter estimated in a case of selecting the ARQ scheme; and selecting the FEC scheme if the first estimated maximum jitter is smaller than the second estimated maximum jitter, and selects the ARQ scheme if the first estimated maximum jitter is larger than the second estimated maximum jitter.

In the eighth aspect of the present invention, the selecting step may select the ARQ scheme even if the first estimated maximum jitter is smaller than the second estimated maximum jitter, in a case where a consumed band increased by selection of the FEC scheme exceeds a usable band.

In the communication unit, communication system, communication method and communication program, the selection of one of the FEC scheme and ARQ scheme that provides a higher effect of suppressing the quality degradation depending on the state of the network allows prevention of the quality degradation during reproduction.

BEST MODE OF CARRYING OUT THE INVENTION

Now, a first best mode of the present invention will be described in detail with reference to the drawings.

Figure 1:
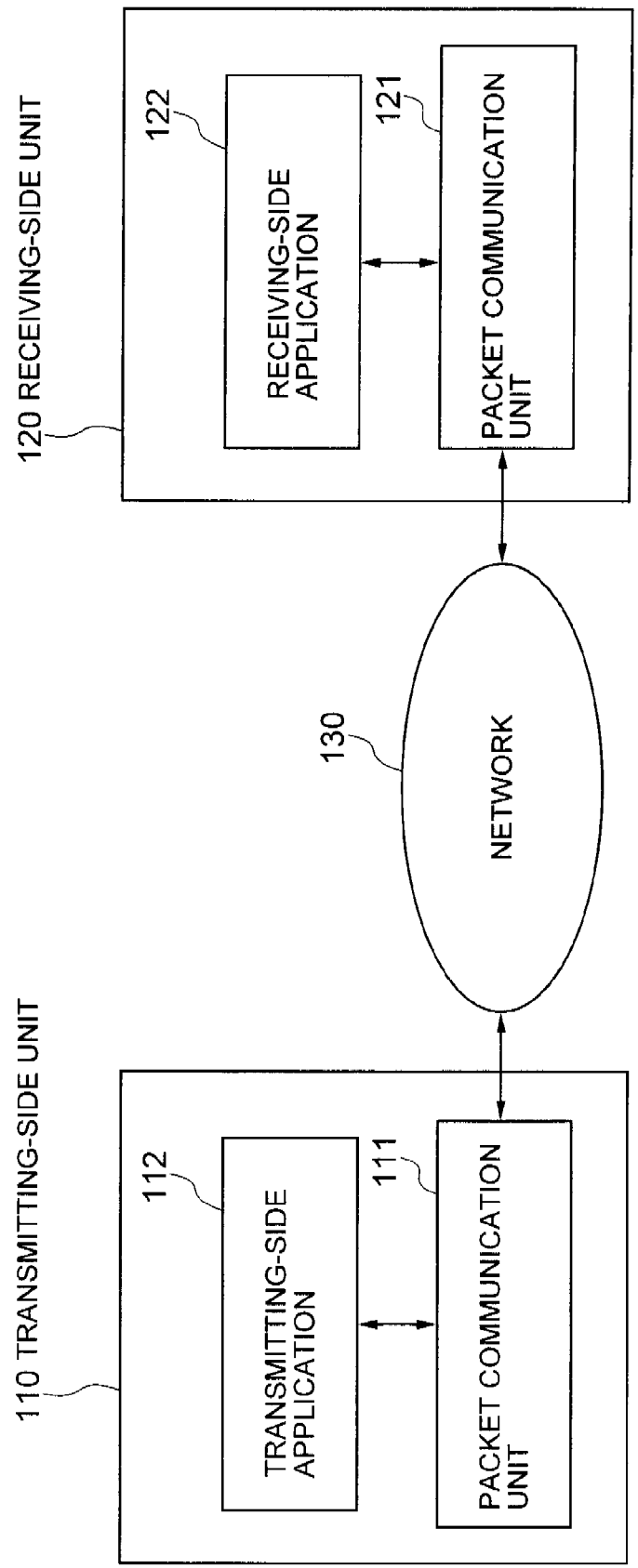
FIG. 1 is a block diagram showing the configuration of a communication system according to the first best mode.

Referring to FIG. 1, a communication system according to a first best mode for carrying out the present invention is such that a transmitting-side unit 110 and a receiving-side unit 120 are connected together via a network 130. The transmitting-side unit 110 is configured by a packet communication unit 111 which transmits a packet to the network 130, and a transmitting-side application 112 which transmits application data to the network 130 via the packet communication unit 111.

The receiving-side unit 120 is configured by a packet communication unit 121 which receives a packet from the network 130, and a receiving-side application 122 which receives the data of the packet from the packet communication unit 121. Although the packet communication unit 111 and packet communication unit 121 are similar units that perform packet communication, they are distinguished from one another because they play different roles in the transmitting-side unit 110 and the receiving-side unit 120. It is to be noted that the role of the transmitting side or receiving side in the transmitting-side unit 110 and receiving-side unit 120 is fixed for the convenience of the description, the role can be arbitrarily switched therebetween, and thus data can be exchanged therebetween.

Figure 2:
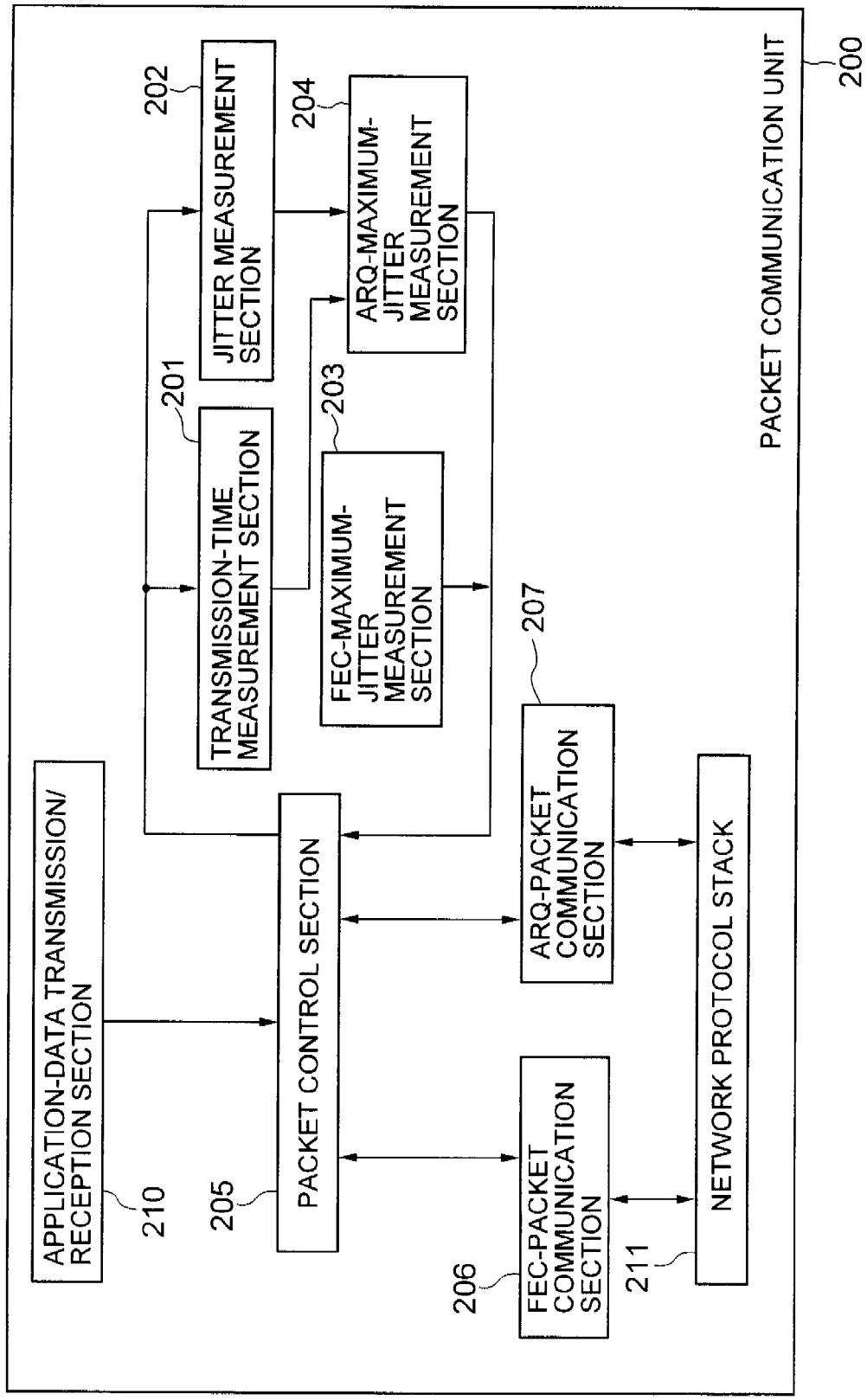
FIG. 2 is a block diagram showing the configuration of the packet communication unit.

FIG. 2 is a block diagram showing the configuration of the packet communication unit 200 (corresponding to the packet communication unit 121 shown in FIG. 1) in the receiving-side unit 120.

With reference to FIG. 2, the packet communication unit 200 includes a transmission-time measurement section 201, a jitter measurement section 202, an FEC-maximum-jitter measurement section 203, an ARQ-maximum-jitter measurement section 204, a packet control section 205, an FEC-packet communication section 206, an ARQ-packet communication section 207, an application-data transmission/reception section 210, and a network protocol stack 211.

The transmission-time measurement section 201 measures the time length (transmission time) needed for transmitting/receiving a packet between the transmitting-side unit 110 and the receiving-side unit 120. The jitter measurement section 202 measures a deviation in the arrival time between a packet which arrived last time and another packet which arrived this time, and calculates a jitter average measured until now by using the deviation as a jitter. The jitter measurement section 202, upon calculating the average value, may calculate a weighted average by weighting nearest previous data. The FEC-maximum-jitter measurement section 203 calculates a maximum jitter (FEC-estimated maximum jitter) estimated from the parameters used in the redundancy (such as a relative redundancy). In this case, the relative redundancy used is determined beforehand. The ARQ-maximum-jitter measurement section 204 calculates the maximum jitter (ARQ-estimated maximum jitter), which is estimated in the case of using the ARQ scheme, based on the result (transmission time length) from the transmission-time measurement section 201, result (jitter average) from the jitter measurement section 202, and the number of times of retransmission determined beforehand.

The packet control section 205 selects an optimum control scheme (either FEC scheme or ARQ scheme) in consideration of the result (FEC-estimated maximum jitter) from the FEC-maximum-jitter measurement section 203, and/or the result (ARQ-estimated maximum jitter) from the ARQ-maximum-jitter measurement section 204, and/or observed transmission time length and packet loss rate, and/or network environment such as band. The packet control section 205 performs exchange of data between the same and the application via the application-data transmission/reception section 210, and notifies packet information to the transmission-time measurement section 201 and/or the jitter measurement section 202 if needed. The packet control section 205 transmits notification of the selected result to the FEC-packet communication section 206, upon selecting the FEC scheme, and transmits notification of the selected result to the ARQ-packet communication section 207, upon selecting the ARQ scheme.

The FEC-packet communication section 206, upon receiving notification of the selected result from the packet control section 205, performs packet transmission/reception based on the FEC scheme, via the network protocol stack 211. The ARQ-packet communication section 207, upon receiving notification of the selected result from the packet control section 205, performs packet transmission/reception based on the ARQ scheme via the network protocol stack 211. If the transmission time length from the transmission-time measurement section 201 or the average value of jitter from the jitter measurement section 202 is changed, the optimum control technique is selected again.

The application-data transmission/reception section 210 exchanges data between the application and the packet control section 205 via an application program interface (API) etc. The network protocol stack 211 performs data communication between the same and the receiving-side unit 120 via the network 130.

Now, operation of the first best mode for carrying out the present invention will be described in detail with reference to the drawings.

Figure 3:
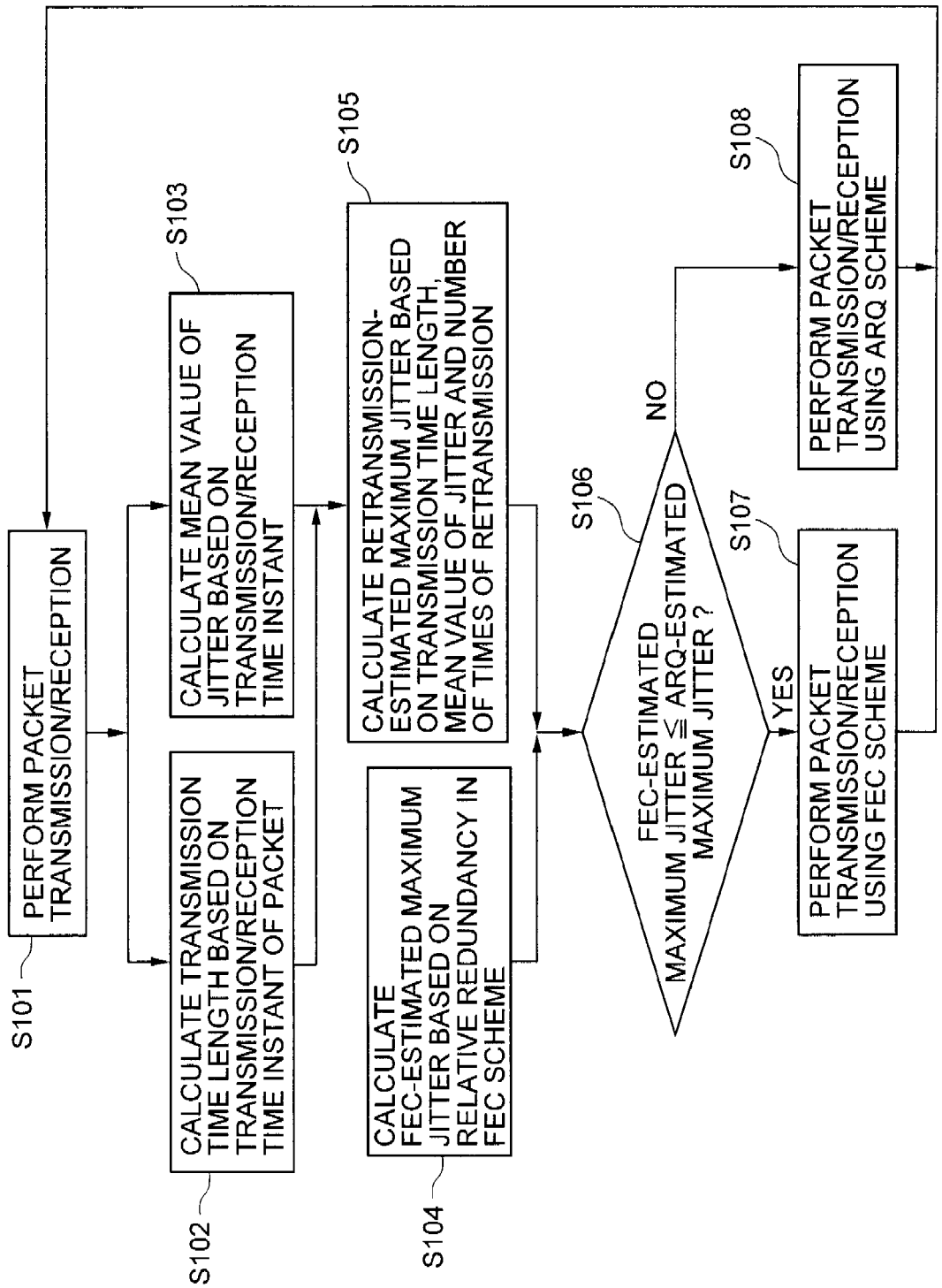
FIG. 3 is a flowchart showing the operation of the first best mode.

FIG. 3 is a flowchart showing operation of the first best mode for carrying out the present invention.

With reference to FIG. 3, the application-data transmission/reception section 210 in the packet communication unit 200 transmits/receives data to/from the transmitting-side application 112 (or receiving-side application 122) (FIG. 3, step S101). The packet communication unit 200 performs packet transmission/reception via the FEC-packet communication section 206 or ARQ-packet communication section 207 (step S101).

Thereafter, the transmission-time measurement section 201 calculates the transmission time length of the packets transmitted/received at step S101 (step S102). The jitter measurement section 202 calculates the average of jitter of the packets transmitted/received in step S101 (step S103). The FEC-maximum-jitter measurement section 203 calculates the FEC-estimated maximum jitter from a parameter (relative redundancy) of the FEC scheme. In this case, the relative redundancy used is determined beforehand (step S104). The ARQ-maximum-jitter measurement section 204 calculates the ARQ-estimated maximum jitter from the transmission time length and average value of jitter, which are measured in step S102 and step S103, and number of times of retransmission determined beforehand (step S105).

The packet control section 205 selects a scheme that provides a smaller value between the FEC-estimated maximum jitter and the ARQ-estimated maximum jitter, calculated in Steps S104 and S105 (the scheme to be selected upon occurring of an equal value is determined beforehand). It is to be noted that the packet control section 205 may take into consideration a factor other than the maximum jitter, if the network states, such as observed transmission time, packet loss rate or band are to be considered.

For example, if the FEC scheme is selected, the consumed band is increased, due to the addition of redundant information, by a corresponding amount. Here, the consumed band is calculated in consideration of an increase from the normal transmission bit rate due to the redundant information added in the redundancy processing performed in the FEC-packet communication section 206.

For example, if a single redundant packet is added to five packets, a consumed band of 20% increases. Even if the calculated maximum jitter is smaller for the FEC scheme, the ARQ scheme is adopted so long as the consumed band exceeds the usable band (step S106).

The packet control section 205 notifies the FEC-packet communication section 206, if the FEC scheme is judged optimum. Subsequently, the FEC-packet communication section 206 starts transmission/reception of a packet between the same and the network 130 via the network protocol stack 211 (step S107). The packet control section 205 notifies the ARQ-packet communication section 207, if the ARQ scheme is judged optimum. Subsequently, the ARQ-packet communication section 207 starts transmission/reception of a packet between the same and the network 130 via the network protocol stack 211 (step S108). Thereafter, the processings from step S101 are iterated.

Since there is no jitter information etc. upon starting of an application, either the FEC scheme or ARQ scheme is set beforehand to start the application.

As described heretofore, it is possible to select the scheme that provides a higher degree of prevention of the quality degradation by using indexes such as transmission time length and jitter that show the state of the network to find the maximum jitter in the case of using the FEC scheme or ARQ scheme, and by selecting the scheme that allows transmission/reception more suited to the video and/or audio delivery in consideration of the network states such as jitter for both the schemes, observed transmission time length, packet loss rate and band.

Next, a second best mode for carrying out the present invention will be described in detail with reference to the drawings.

Figure 4:
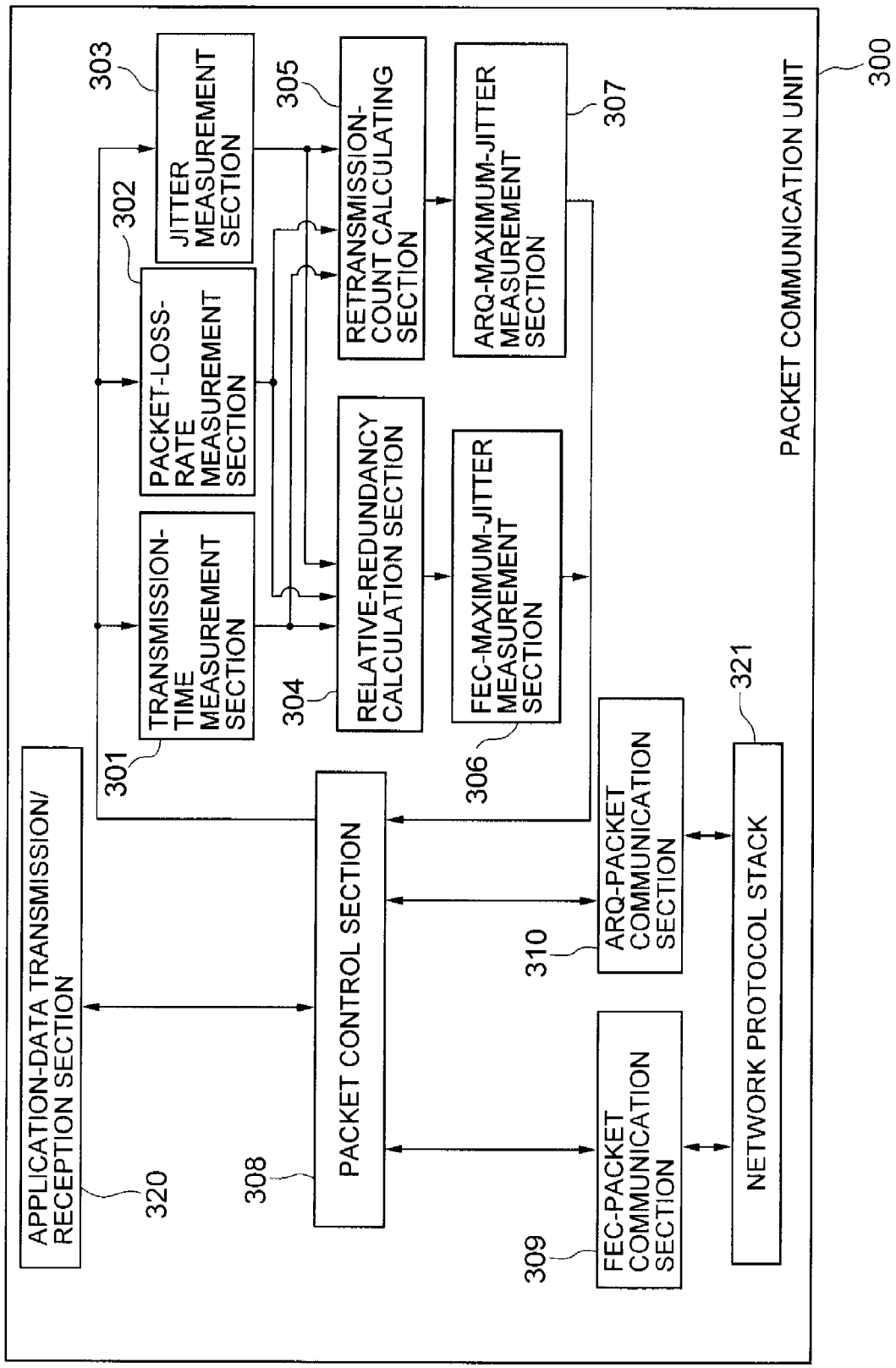
FIG. 4 is a block diagram showing the configuration of a second best mode.

FIG. 4 is a block diagram showing the configuration of the second best mode for carrying out the present invention.

With reference to FIG. 4, the packet communication unit 300 includes a transmission-time measurement section 301, a packet-loss-rate measurement section 302, a jitter measurement section 303, a relative-redundancy calculation section 304, a retransmission-count calculation section 305, an FEC-maximum-jitter measurement section 306, an ARQ-maximum-jitter measurement section 307, a packet control section 308, an FEC-packet communication section 309, an ARQ-packet communication section 310, an application-data transmission/reception section 320, and a network protocol stack 321.

The transmission-time measurement section 301 measures the time length (transmission time) needed for transmission/reception of a packet between the transmitting-side unit 110 and the receiving-side unit 120. The packet-loss-rate measurement section 302 counts the number of packets which have not arrived despite the transmission of the packets, and calculates the loss rate (packet loss rate) of the packets. The jitter measurement section 303 measures the deviation of the arrival time between the packet which arrived last time and the packet which arrived this time, and calculates the average value of jitter. The jitter measurement section 303, upon calculating the average value, may calculate a weighted average by weighting the nearest packet.

The relative-redundancy calculation section 304 calculates the optimum relative redundancy needed for packet transmission in the case of using the ARQ scheme, based on the transmission time length from the transmission-time measurement section 301, packet loss rate from the packet-loss-rate measurement section 302, average value of jitter from the jitter measurement section 303, and a required reproduction signal quality.

The retransmission-count calculation section 305 calculates the number of times of retransmission needed for the packet transmission in the case of using the ARQ scheme based on the transmission time length from the transmission-time measurement section 301, packet loss rate from the packet-loss-rate measurement section 302, average value of jitter from the jitter measurement section 303, and the required reproduction signal quality.

The FEC-maximum-jitter measurement section 306 calculates the maximum jitter (FEC-estimated maximum jitter) estimated from the parameter (optimum relative redundancy) calculated by the relative-redundancy calculation section 304. The ARQ-maximum-jitter measurement section 307 calculates the maximum jitter (ARQ-estimated maximum jitter) in the case of using the ARQ scheme from the number of times of retransmission calculated by retransmission-count calculation section 305. The packet control section 308 selects an optimum control scheme in consideration of the FEC-estimated maximum jitter from the FEC-maximum-jitter measurement section 306, and the ARQ-estimated maximum jitter from the ARQ-maximum-jitter measurement section 307, and/or observed transmission time length and packet loss rate, and/or network environment such as a band.

The packet control section 308 transmits, upon selecting the FEC scheme, a selected result to the FEC-packet communication section 309, and, transmits, upon selecting the ARQ scheme, a selected result to the ARQ-packet communication section 310. The FEC-packet communication section 309 performs transmission/reception of a packet based on the FEC scheme, upon receiving notification of the selection from the packet control section 308. The ARQ-packet communication section 310 performs transmission/reception of a packet based on the ARQ scheme, upon receiving notification of the selection from the packet control section 308. If the transmission time length from the transmission-time measurement section 301, average value of jitter from the jitter measurement section 303, or packet loss rate from the packet-loss-rate measurement section 302 is changed, the packet control section 308 repeats the above processings to again select a suitable control scheme.

The application-data transmission/reception section 320 exchanges data between the transmitting-side application 112 or receiving-side application 122 and the packet control section 308 via the application program interface etc. The network protocol stack 321 performs data communication between the same and the receiving-side unit 120 via the network 130.

Next, operation of the second best mode for carrying out the present invention will be described in detail with reference to the drawings.

Figure 5:
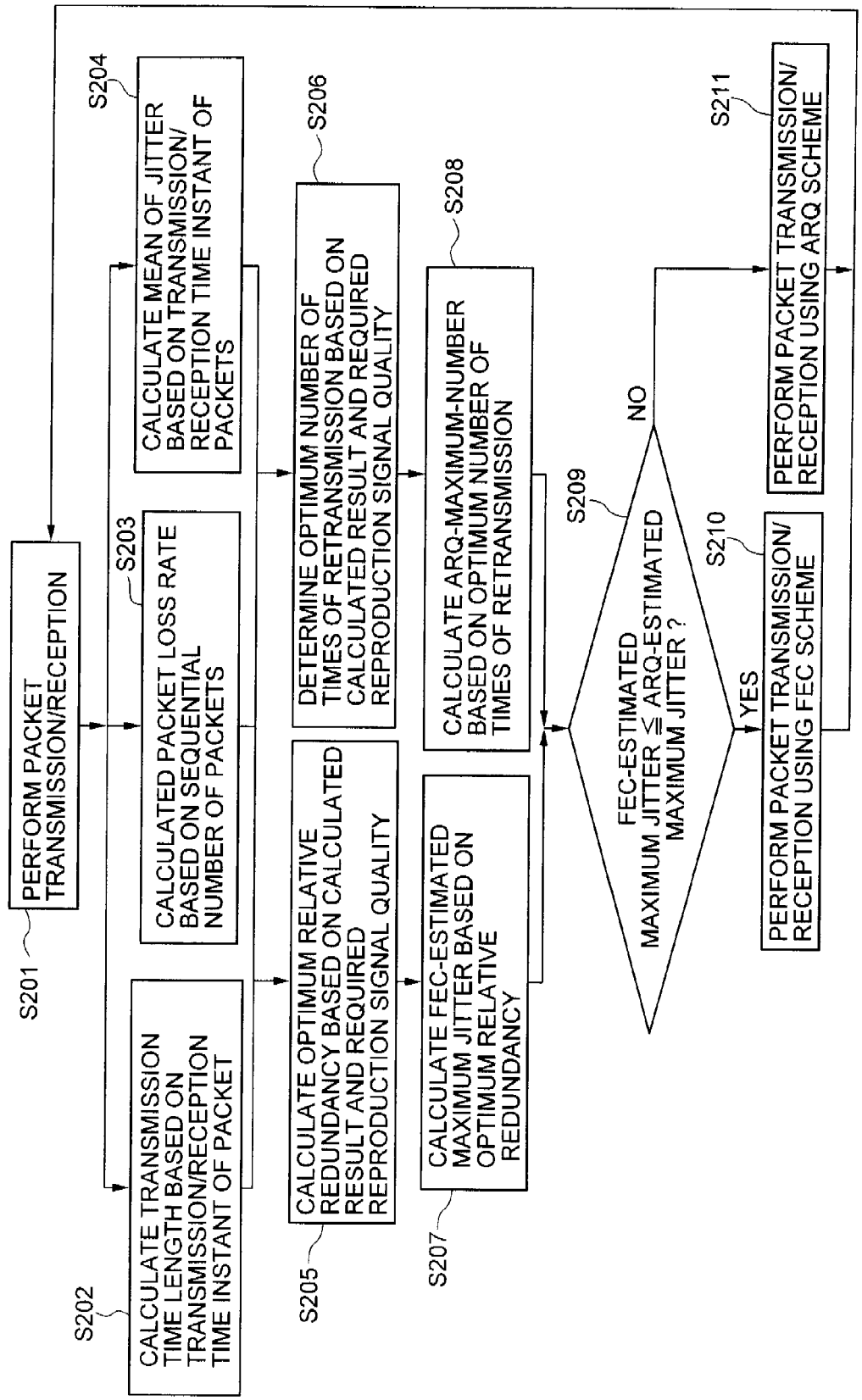
FIG. 5 is a flowchart showing the operation of the second best mode.

FIG. 5 is a flowchart showing operation of the second best mode for carrying out the present invention.

The application-data transmission/reception section 320 in the packet communication unit 300 performs transmission/reception of a packet between the same and the transmitting-side application 112 (or receiving-side application 122) (FIG. 5, step S201). The transmission-time measurement section 301 calculates the transmission time length from the transmission/reception time instant of the packet transmitted/received in step S201 (step S202).

The packet-loss-rate measurement section 302 calculates the packet loss rate by using the sequential number of the packets received in step S201 (omission of a sequential number means a loss) (step S203). The jitter measurement section 303 calculates the average value of jitter from the receiving time of the packets transmitted/received (step S204). The relative redundancy calculation section 304 calculates an optimum relative redundancy based on the transmission time length, packet loss rate, average value of jitter, requested reproduction signal quality, which are calculated in step S202, step S203, and Step S204 (step S205).

The optimum relative redundancy is referred to as a relative redundancy which can be calculated in consideration whether the requested reproduction signal quality is realized by the degree of redundancy needed for the packet loss rate observed at present in consideration of, for example, the characteristic of the codec (for example, the minimum relative redundancy which can realize the requested reproduction signal quality). As a concrete example, it is assumed here that there is an FEC scheme such that ten data packets can be restored by attaching redundant packets in number of (n+1) even if n out of the ten data packets are lost. Use of a codec which can afford a MOS (mean opinion score) of 4 is estimated for a packet loss rate of 10% in such an FEC scheme. If the packet loss rate observed is 20% and the required quality is a MOS of 4, then it is necessary to set the observed packet loss rate of 20% at an apparent packet loss rate of 10% in order to realize the required quality. It is possible to achieve the purpose by adding three redundant packets thereto. It should be noted that the FEC scheme is not limited to the concrete example presented.

The FEC-maximum-jitter measurement section 306 calculates the maximum jitter (FEC-estimated maximum jitter) estimated when a FEC scheme is adopted from the parameter (optimum relative redundancy) of the FEC scheme calculated in step S205 (step S207).

The retransmission-time calculating section 305 calculates the optimum number of times of retransmission based on the transmission time length, packet loss rate, average value of jitter, requested reproduction signal quality, which are calculated in Step 202, step S203, and step S204 (step S206). The optimum number of times of retransmission is calculated in consideration what degree of packet retransmission is to be performed for achieving the requested reproduction signal quality for the delay and packet loss rate that are observed at present in consideration of, for example, the characteristic of the codec (for example, the minimum number of times of retransmission which can realize the requested reproduction signal quality).

As a concrete example, use of a codec which can afford a MOS of 4 is estimated for a packet loss rate of 10%. If the retransmission is performed once for the case of an observed loss rate of 20%, then the probability that the retransmitted packet is stochastically lost assumes 4%. Therefore, a single-time retransmission realizes an apparent loss rate within 10%, and thus the single-time retransmission is found. It should be noted that the ARQ scheme is not limited to the concrete example presented.

The ARQ-maximum-jitter measurement section 307 calculates the maximum jitter (ARQ-estimated maximum jitter) estimated when the ARQ scheme is adopted from the number of times of retransmission calculated in step S206 (step S208). The packet control section 308 selects a scheme which affords a smaller value between the FEC-estimated maximum jitter calculated in Steps S207 and the ARQ-estimated maximum jitter and S208 (step S209). It should be noted that the packet control section 308 can also take into consideration factors other than the maximum jitter if the network environments such as the transmission time length, packet loss rate and band are considered. For example, if the FEC scheme is selected, the consumed band increases due to addition of the redundant information, by a corresponding amount.

Here, the consumed band is calculated in consideration of an increase of the redundant information added to the normal transmission bit rate by the redundancy processing calculated in the relative-redundancy calculation section 304. For example, if a single redundancy packet is added to five packets, the consumed band increases by 20%. If the consumed band has exceeded the usable band, the packet control section 308 selects the ARQ scheme, even if the calculated maximum jitter is smaller for the FEC scheme.

The packet control section 308 notifies the FEC-packet communication section 309, if the FEC scheme is judged optimum. Thereafter, the FEC-packet communication section 309 starts transmission/reception of a packet between the same and the network 130 via the network protocol stack 321, and returns to step S201 (step S210).

The packet control section 308 notifies the ARQ-packet communication section 310, if the ARQ scheme is judged optimum. Thereafter, the ARQ-packet communication section 310 starts transmission/reception of a packet between the same and the network 130 via the network protocol stack 321, and returns to step S201 (step S211). Since there is no information of jitter etc., upon the start of an application, either the FEC scheme or ARQ scheme is set beforehand, to start the application.

As described above, calculation of the optimum parameter for each of the FEC scheme and ARQ scheme allows dealing with a variety of changes in the network. In addition, for an application that requires real time processing, a scheme that has a higher effect of preventing the quality degradation can be selected by using the indexes showing the network states such as the transmission time length, packet loss rate and jitter, finding the maximum jitter upon using the FEC scheme or ARQ scheme, considering the network states such as the maximum jitter, observed transmission/reception time length, packet loss rate and band, and selecting a transmission/reception scheme which is more suited to the video and audio delivery.

Now, a second best mode for carrying out the present invention will be described.

Figure 6:
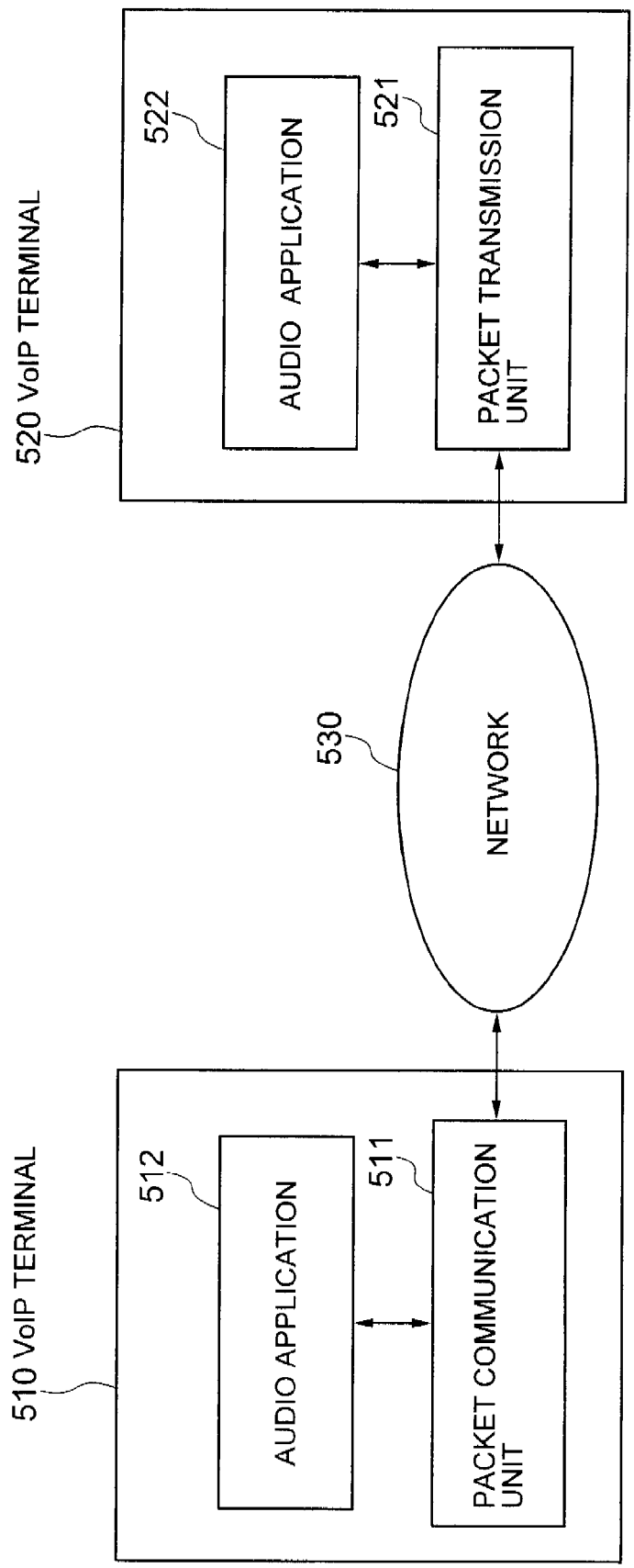
FIG. 6 is a block diagram showing the configuration of an example of the second best mode.

FIG. 6 is a block diagram showing the configuration of an example of the second best mode.

With reference to FIG. 6, the example of the second best mode includes a VoIP terminal 510, a VoIP terminal 520 (voice over Internet Protocol), and a network 530. VoIP terminal 510 includes a packet communication unit 511 and an audio application 512. VoIP terminal 520 includes a packet communication unit 521 and an audio application 522. This system is an example of the VoIP system which performs mutual audio communication in real time. VoIP terminal 510 and VoIP terminal 520 perform audio transmission/reception therebetween via an RTP (real-time transport protocol), which is a data transport protocol generally used for a real time application, and RTCP (RTP control protocol), which is a control protocol thereof. On the network 530, there are operated services other than the service of VoIP system, and the network state are fluctuated at any time.

FIGS. 7, 8, 9, and 10 are timing charts for showing operation of the present example.

Figure 7:
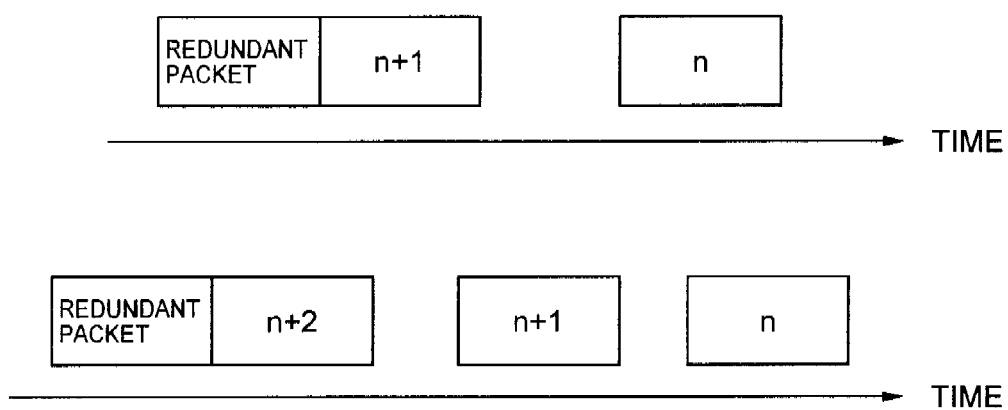
FIG. 7 is a timing chart showing the operation of an example of the second best mode.
Figure 8:
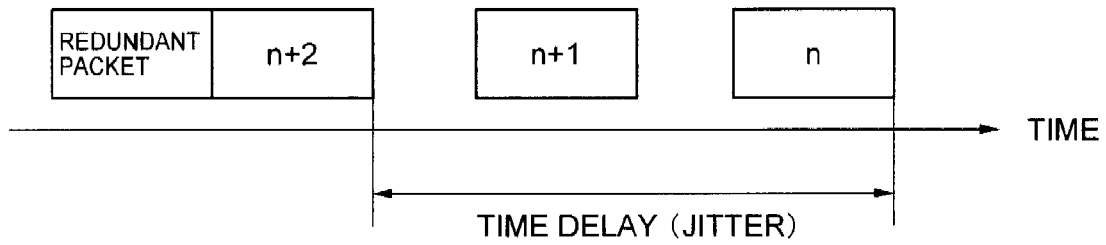
FIG. 8 is a timing chart showing the operation of an example the second best mode.

With reference to FIG. 7, the FEC scheme shown therein is used as the FEC scheme which the FEC-packet communication sections 309 in packet communication unit 511 and packet communication unit 521 adopt. The maximum jitter estimated in this case will be described using FIG. 8. With reference to FIG. 8, for the redundancy, a single redundant packet is created for three audio packets, and the redundant packet is transmitted simultaneously with the transmission of the third audio packet. For example, if a packet (packet of sequential number n in FIG. 8) is lost, arrival of the redundant packet is awaited for recovery thereof. For this reason, the time delay until the redundant packet arrives is regarded as the maximum jitter.

Figure 9:
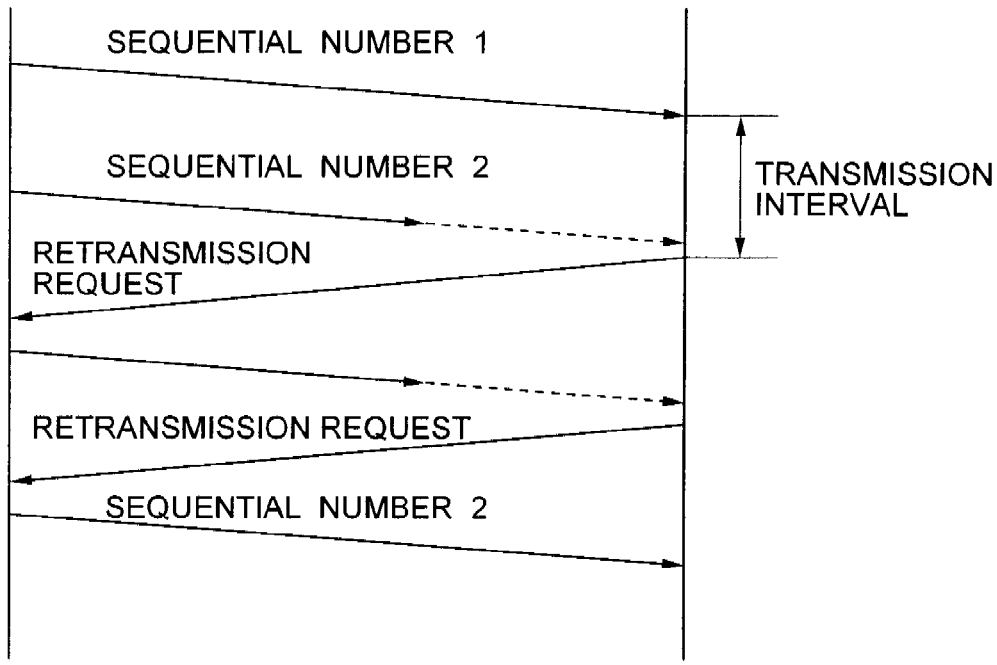
FIG. 9 is a timing chart showing the operation of an example of the second best mode.

The ARQ-packet communication section 310 predicts the scheme which issues a retransmission request as shown in FIG. 9 with respect to the packet which did not arrive. In FIG. 9, if a packet of sequential number 2 does not arrive after arrival of a packet of sequential number 1 until waiting for the time interval for transmission, the receiving side issues a retransmission request to the transmitting side. A packet of sequential number 2 arrives after the transmission time length elapses since the issuance of the retransmission request if there is no packet loss.

If a packet of sequential number 2 does not arrive until the transmission time length elapses, the retransmission request is issued again. The number of redundant packets to be generated and the upper limit of the number of retransmission times are determined based on the network quality such as packet loss and the required reproduction signal quality.

Packet communication unit 511 and packet communication unit 512 included in the VoIP terminals 510 and packet communication unit 512, respectively, calculate transmission time length, packet loss rate and jitter by using the following technique. Although the technique is described below mainly for VoIP terminal 520, it is possible for VoIP terminal 510 to perform similar processings. The transmission time length can be found by using the RTCP exchanged between VoIP terminal 510 and VoIP terminal 520.

A concrete description will be made below. VoIP terminal 520 transmits an RTCP to VoIP terminal 510, and VoIP terminal 520 stores the transmission time instant thereof. VoIP terminal 510 measures the time length from the time instant of receipt of the RTCP until the transmission of the response to the RTCP, indicates the same in the packet responding to the RTCP, and transmits the same to VoIP terminal 520. VoIP terminal 520, which received the response from VoIP terminal 510, records the receiving time instant. VoIP terminal 520 can obtain the transmission time length from the transmission time instant of RTCP, receiving time instant and processing time length in VoIP terminal 510.

If the RTCP is not used, a technique using an external tool such as ping may be used for obtaining the transmission time length. The packet loss rate can be obtained by VoIP terminal 520 from the audio packet transmitted from VoIP terminal 510. This is because the number representing the transmitting order referred to as the sequential number is attached to the RTP packet, which is a audio packet, and thus VoIP terminal 520 grasps whether or not the packet loss has occurred by monitoring whether or not the sequential numbers included in the RTP packets arrive in sequence.

The jitter can also be obtained by VoIP terminal 520 similarly to the packet loss rate from the audio packet transmitted from VoIP terminal 510. The RTP packet configuring an audio packet includes information referred to as a time stamp representing the time instant at which VoIP terminal 510 transmitted the audio packet, and thus it is possible for VoIP terminal 520 to measure the jitter from the time stamp information and the time instant of receipt of the packet.

The FEC-maximum-jitter measurement section 306 included in packet communication unit 521 calculates the maximum jitter in the case of employing the FEC scheme in FIG. 7. Since there is no retransmission In the FEC scheme, the time length until the redundant packet arrives can be regarded as the jitter. For example, if a single redundant packet is created for two audio packets, the redundant packet is transmitted after the two audio packets are transmitted, and the receiving side determines whether or not the two packets have no error after receiving the redundant packet.

Figure 10:
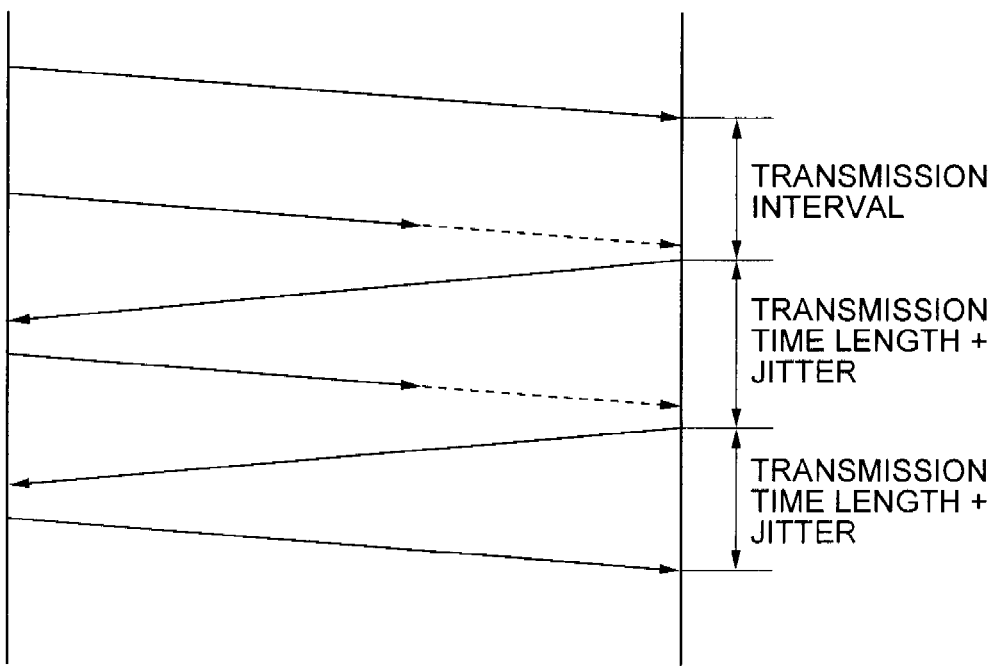
FIG. 10 is a timing chart showing the operation of the present example.

Accordingly, the time length until the two audio packets are transmitted is the maximum jitter in this case. In this example, it is assumed that the transmission interval is 20 milliseconds, for the sake of a concrete description. In this case, the maximum jitter is 40 milliseconds if the FEC scheme is adopted. The ARQ-maximum-jitter measurement section 307 included in packet communication unit 521 calculates the maximum jitter in the case of adopting the ARQ scheme. For example, as shown in FIG. 10, if the retransmission is performed twice, the maximum jitter which may possibly occur can be considered equal to that occurring in the case of performing two times of retransmission involving (transmission time+average jitter). As to the number of times of retransmission, it is possible to dynamically determine by a method of setting beforehand or the packet loss rate observed.

For example, the number of times of retransmission can be obtained from the packet arrival rate needed to satisfy the reproduction signal quality, and the packet loss rate observed. Here, it is assumed that the packet arrival rate needed to satisfy the reproduction can be calculated by performing two times of retransmission from the packet loss rate observed, for a concrete description. It is also assumed in this case that the jitter observed is satisfactorily small value compared to the transmission time length. In this example, the maximum jitter in the case of adopting the ARQ scheme can be calculate by (2×(transmission time length+average jitter)).

The control-scheme selection section included in packet communication unit 521 compares the maximum jitter calculated in the FEC-maximum-jitter measurement section 306, for example, against the maximum jitter calculated by the ARQ-maximum-jitter measurement section 307, and selects a scheme having a smaller maximum jitter. In this example, as stated previously, it is assumed that the maximum jitter in the case of adopting the FEC scheme is 40 milliseconds and the maximum jitter in the case of employing the ARQ scheme is 2×(transmission time length+average jitter)).

If the (transmission time+average jitter) measured by the packet communication unit 521 is below 20 milliseconds, then the maximum jitter of the ARQ scheme is smaller than the maximum jitter of the FEC scheme, and the ARQ scheme is selected. On the other hand, if the (transmission time length+average jitter) measured in the packet communication unit 521 is equal to or above 20 milliseconds, then the FEC scheme is selected because the maximum jitter of the FEC scheme is smaller than the maximum jitter of the ARQ scheme. Packet communication unit 521 included in VoIP terminal 520 performs packet transmission/reception based on the FEC scheme. VoIP terminal 510 also performs similar processings, to select the optimum packet transmission/reception scheme.

The control of the packet communication unit 200 and packet communication unit 300 may be executed by a software program or firmware program. The software program or firmware program is stored in a memory, which is not illustrated, for execution of the same.

INDUSTRIAL APPLICABILITY

According to the present invention, a suitable communication scheme can be selected in a real-time application such as video and audio delivery, whereby quality degradation due to packet loss can be suppressed

The invention claimed is:

1. A communication unit comprising:
a transmission-time measurement section that calculates a transmission time length of a packet;
a jitter measurement section that calculates an average value of jitter based on a arrival time of the packet;
a packet-loss-rate measurement section that counts a sequential number of received packets and calculates a packet loss rate based on said sequential number of received packets;
a relative-redundancy calculation section that calculates, based on said transmission time length, said packet loss rate, said average value of jitter and a requested reproduction signal quality, a relative redundancy which can realize a requested reproduction signal quality in a forward error correction (FEC) scheme;
a retransmission-count calculation section that, in view of a characteristic of codec, calculates, based on said transmission time length, said average value of jitter, said packet loss rate and said requested reproduction signal quality, a number of times of retransmission that can realize said requested reproduction signal quality in an automatic repeat request (ARQ) scheme;
an FEC-maximum-jitter measurement section that calculates, based on said calculated relative redundancy, a first estimated maximum jitter representing a maximum jitter estimated in a case of selecting said FEC scheme;
an ARQ-maximum-jitter measurement section that calculates, based on said calculated number of times of retransmission, a second estimated maximum jitter representing a maximum jitter estimated in a case of selecting said ARQ scheme; and
a packet control section that selects said FEC scheme if said first estimated maximum jitter is smaller than said second estimated maximum jitter, and selects said ARQ scheme if said first estimated maximum jitter is larger than said second estimated maximum jitter, and the packet control section selects between one of said FEC scheme and said ARQ scheme again if any of said transmission time length, said packet loss rate, and said average value of jitter is changed.

2. The communication unit according to claim 1, wherein said packet control section selects said ARQ scheme even if said first estimated maximum jitter is smaller than said second estimated maximum jitter, in a case where a consumed band increased by selection of said FEC scheme exceeds a usable band.

3. A communication system comprising a transmitting-side unit including the communication unit according to claim 1, a receiving-side unit including the communication unit according to claim 1, and a network connecting together said transmitting-side unit and said receiving-side unit.

4. A communication method comprising the steps of:
calculating a transmission time length of a packet;
calculating an average value of jitter based on a arrival time of the packet;
counting a sequential number of received packets and calculating a packet loss rate based on the sequential number of received packets;
calculating in view of a characteristic of codec, based on said transmission time length, said average value of jitter, said packet loss rate and a requested reproduction signal quality, a relative redundancy which can realize a requested reproduction signal quality in a forward error correction (FEC) scheme;
calculating, based on said packet loss rate, said transmission time length, said average value of jitter and said requested reproduction signal quality, a number of times of retransmission that can realize said requested reproduction signal quality in an automatic repeat request (ARQ) scheme;
calculating, based on said calculated relative redundancy, a first estimated maximum jitter representing a maximum jitter estimated in a case of selecting said FEC scheme;
calculating, based on said calculated number of times of retransmission, a second estimated maximum jitter representing a maximum jitter estimated in a case of selecting said ARQ scheme; and
selecting said FEC scheme if said first estimated maximum jitter is smaller than said second estimated maximum jitter, and selecting said ARQ scheme if said first estimated maximum jitter is larger than said second estimated maximum jitter, and selecting between one of said FEC scheme and said ARQ scheme again if any of said transmission time length, said packet loss rate, and said average value of jitter is changed.

5. The communication method according to claim 4, wherein said selecting step selects said ARQ scheme even if said first estimated maximum jitter is smaller than said second estimated maximum jitter in a case where a consumed band increased by selection of said FEC scheme exceeds a usable band.

6. A non-transitory computer readable medium encoded with a computer program defining the steps of:
   calculating a transmission time length of a packet;
   calculating an average value of jitter based on a arrival time of the packet;
   counting a sequential number of received packets and calculating a packet loss rate based on said sequential number of received packets;
   calculating in view of a characteristic of codec, based on said transmission time length, said average value of jitter, said packet loss rate and a requested reproduction signal quality, a relative redundancy which can realize a requested reproduction signal quality in a forward error correction (FEC) scheme;
   calculating, based on said packet loss rate, said transmission time length, said average value of jitter and said requested reproduction signal quality, a number of times of retransmission that can realize said requested reproduction signal quality in an automatic repeat request (ARQ) scheme;
   calculating, based on said calculated relative redundancy, a first estimated maximum jitter representing a maximum jitter estimated in a case of selecting said FEC scheme;
   calculating, based on said calculated number of times of retransmission, a second estimated maximum jitter representing a maximum jitter estimated in a case of selecting said ARQ scheme; and
   selecting said FEC scheme if said first estimated maximum jitter is smaller than said second estimated maximum jitter, and selecting said ARQ scheme if said first estimated maximum jitter is larger than said second estimated maximum jitter, and selecting between one of said FEC scheme and said ARQ scheme again if any of said transmission time length, said packet loss rate, and said average value of jitter is changed.

7. The computer readable according to claim 6, wherein said selecting step selects said ARQ scheme even if said first estimated maximum jitter is smaller than said second estimated maximum jitter, in a case where a consumed band increased by selection of said FEC scheme exceeds a usable band.

* * * * *